March 5, 1957 E. O. HELEEN 2,783,605
CRANBERRY HARVESTER
Filed Jan. 22, 1954 6 Sheets-Sheet 2

INVENTOR.
EDWIN O. HELEEN,
BY
McMorrow, Berman + Davidson
ATTORNEYS

March 5, 1957 E. O. HELEEN 2,783,605
CRANBERRY HARVESTER
Filed Jan. 22, 1954 6 Sheets-Sheet 3

INVENTOR.
EDWIN O. HELEEN,
BY
McMorrow, Berman + Davidson
ATTORNEYS

March 5, 1957 E. O. HELEEN 2,783,605
CRANBERRY HARVESTER

Filed Jan. 22, 1954 6 Sheets-Sheet 4

INVENTOR.
EDWIN O. HELEEN,
BY
McMorrow, Berman & Davidson
ATTORNEYS

March 5, 1957

E. O. HELEEN 2,783,605

CRANBERRY HARVESTER

Filed Jan. 22, 1954

INVENTOR.
EDWIN O. HELEEN,
BY
McMorrow, Berman + Davidson
ATTORNEYS

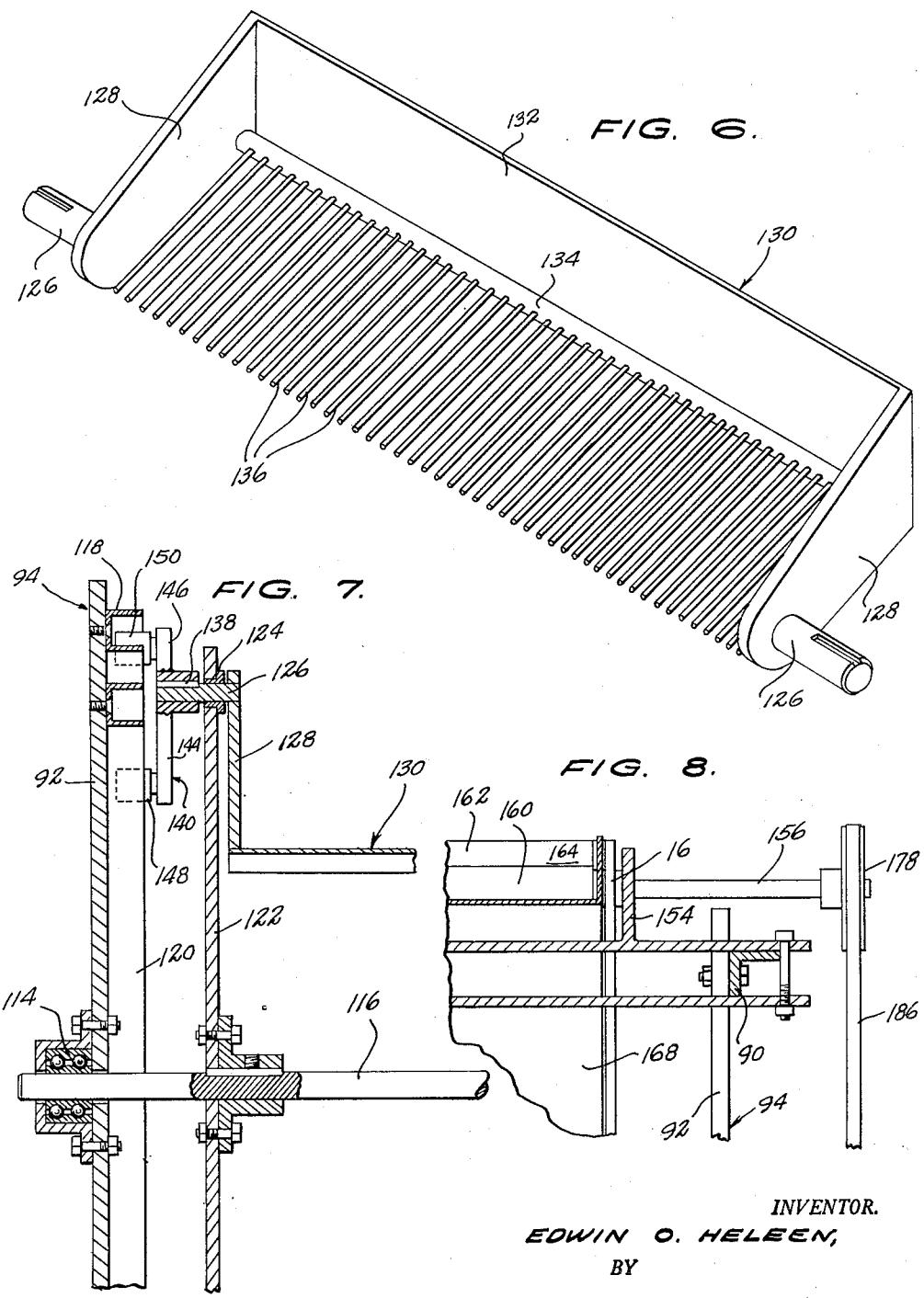

United States Patent Office 2,783,605
Patented Mar. 5, 1957

2,783,605
CRANBERRY HARVESTER
Edwin O. Heleen, West Wareham, Mass.

Application January 22, 1954, Serial No. 405,535

4 Claims. (Cl. 56—330)

This invention relates to a cranberry harvester of the type in which the berry stripping fingers move in a closed path about a substantially horizontal axis which lies perpendicular to the path of advance of the harvester.

As exemplified in Patent Nos. 546,777; 1,090,860; 1,632,597; and 2,524,631; picker fingers move in closed paths about a substantially horizontal axis for the purpose of stripping the fruit from the standing plants. Also, in practically every case the stripping fingers move upwardly to perform their stripping operation to the rear of the horizontal axis, and in various instances, the fingers themselves move about circumferentially spaced horizontal axes which move in a closed path as the picker advances.

Owing to the nature of the cranberry plants, to which this invention is applicable, the stalks bearing the fruit frequently sprout from runners which lie on the upper surface of thet ground with the result that as the cranberry pickers of the prior art have a tendency to pull the stalks and runners upwardly as the berries are being stripped therefrom and thus not only impairing the stripping operation but also injuring the plants.

The primary object of this invention is to hold the fruit bearing stalks downwardly during the final stripping of the fruit therefrom so as to avoid any possibility of uprooting the plants.

Another object is to so support the picker that it may readily follow the contours of the surface being traversed to ensure the collection by the picker fingers of the lowermost fruit borne on the stalks.

A further object is to collect the fruit as it is being picked in a suitable container carried by the picker in such a position that when it is filled it may readily be removed from the picker and a new one substituted without interrupting the fruit picking operation.

Still another object is a novel drive by means of which the operation of the picker fingers may be timed relative to the speed of advance of the picker and also to select the path along which the picker operates.

The above and other objects may be attained by employing this invention which embodies among its features a frame, an arm carried by the frame and extending laterally outwardly therefrom, an axle mounted on the frame and on the arm for rotation about an axis which lies perpendicular to the frame, a ground wheel carried by the axle for rotation about the axis, a traction wheel carried by the axle for rotation therewith, a steering wheel carried by the frame in advance of the axle, a prime mover carried by the frame in advance of the arm, a drive shaft carried by the frame and by the arm in parallel relation to the axle, means operatively connected to the prime mover and to the drive shaft for establishing driving connection therebetween, means connected to the drive shaft and to the axle for establishing driving connection therebetween, a harvesting unit carried by the arm to move in a vertical arcuate path adjacent the frame and in advance of the arm, means connected to the harvesting unit and to the drive shaft for establishing driving connection between the drive shaft and the harvesting unit, and means connected to the arm and to the harvesting unit for yieldingly holding the harvesting unit in a selected position in its arcuate path.

Other features include a harvesting unit mounted to advance in a selected path, a rotor mounted in said unit to rotate about an axis normal to the path of advance, stripping combs carried by said rotor for movement in a closed path about thet axis, and means carried by the harvesting unit and operatively engaging the combs for altering the angular positions thereof as they move in the circular path.

Still other features include a ground contacting roller carried by the harvesting unit for supporting said unit in its lowermost position adjacent the ground and for holding the stalks down during the upward stripping movement of the stripping combs or fingers.

Other features include an apron carried by the harvesting unit and extending upwardly and rearwardly between the unit and the arm for receiving the crops harvested by the harvesting unit, and an elevator carried by the apron and operable thereagainst for elevating the harvested crops as they are deposited on the apron, and a crop receiving chute carried by the apron and extending downwardly and rearwardly therefrom adjacent the upper end thereof through which harvested crops may be discharged into a suitable receptacle.

In the drawings:

Figure 6 is an enlarged perspective view of one of the fruit stripping combs;

Figure 7 is a fragmentary enlarged sectional view taken substantially on the line 7—7 of Figure 4;

Figure 8 is a fragmentary enlarged sectional view taken substantially on the line 8—8 of Figure 2;

Figure 9 is an enlarged perspective view of one of the rock arms used for controlling the rocking movements of the combs; and Figure 10 is a fragmentary sectional view taken substantially on the line 10—10 of Figure 2.

Frame

Figure 1:
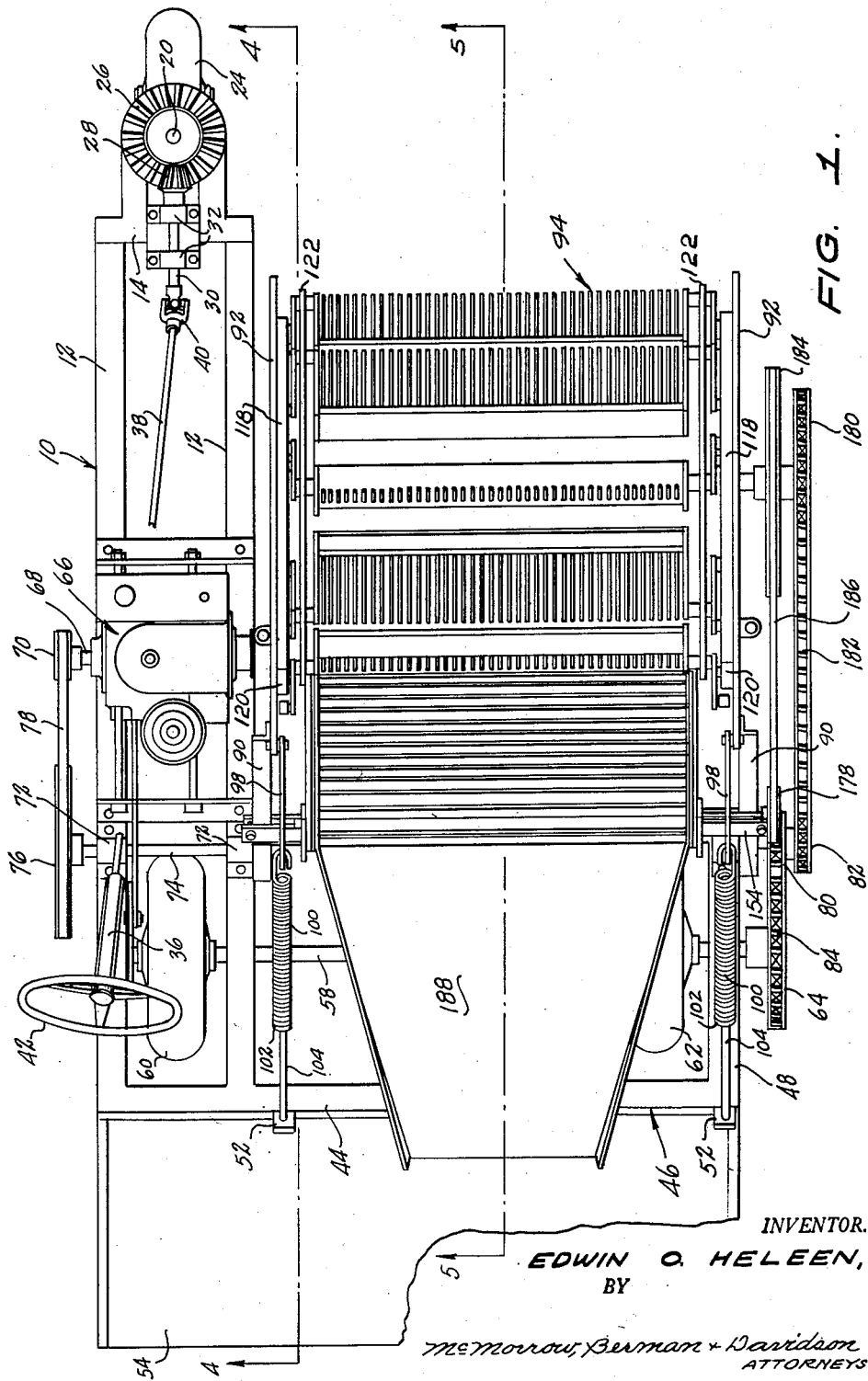
Figure 1 is a top plan view, with parts broken away, of a cranberry harvester embodying the features of this invention.
Figure 2:
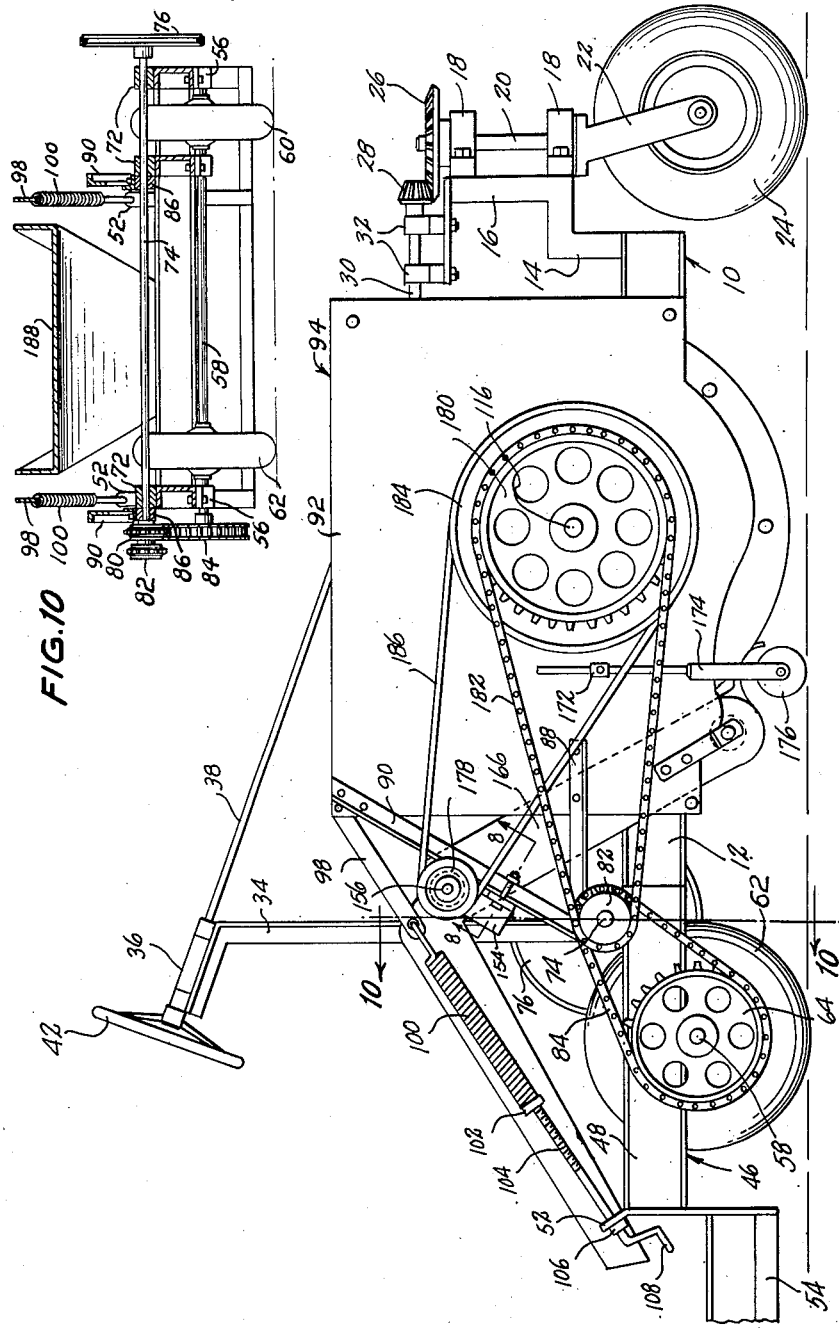
Figure 2 is a side view, with parts broken away, of the harvester illustrated in Figure 1.
Figure 3:
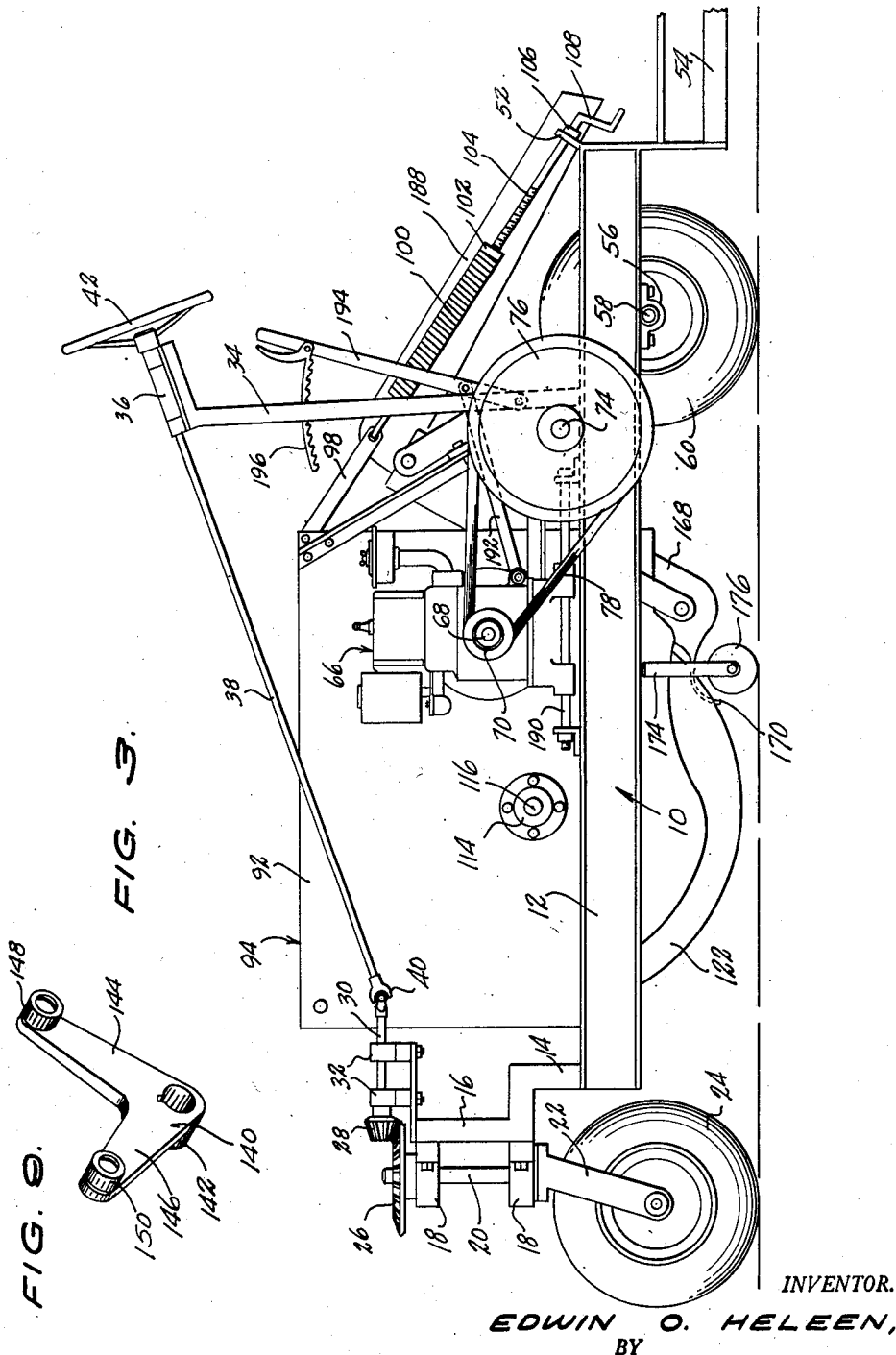
Figure 3 is a view, with parts broken away, similar to Figure 2, taken from the opposite side of the harvester.
Figure 4:
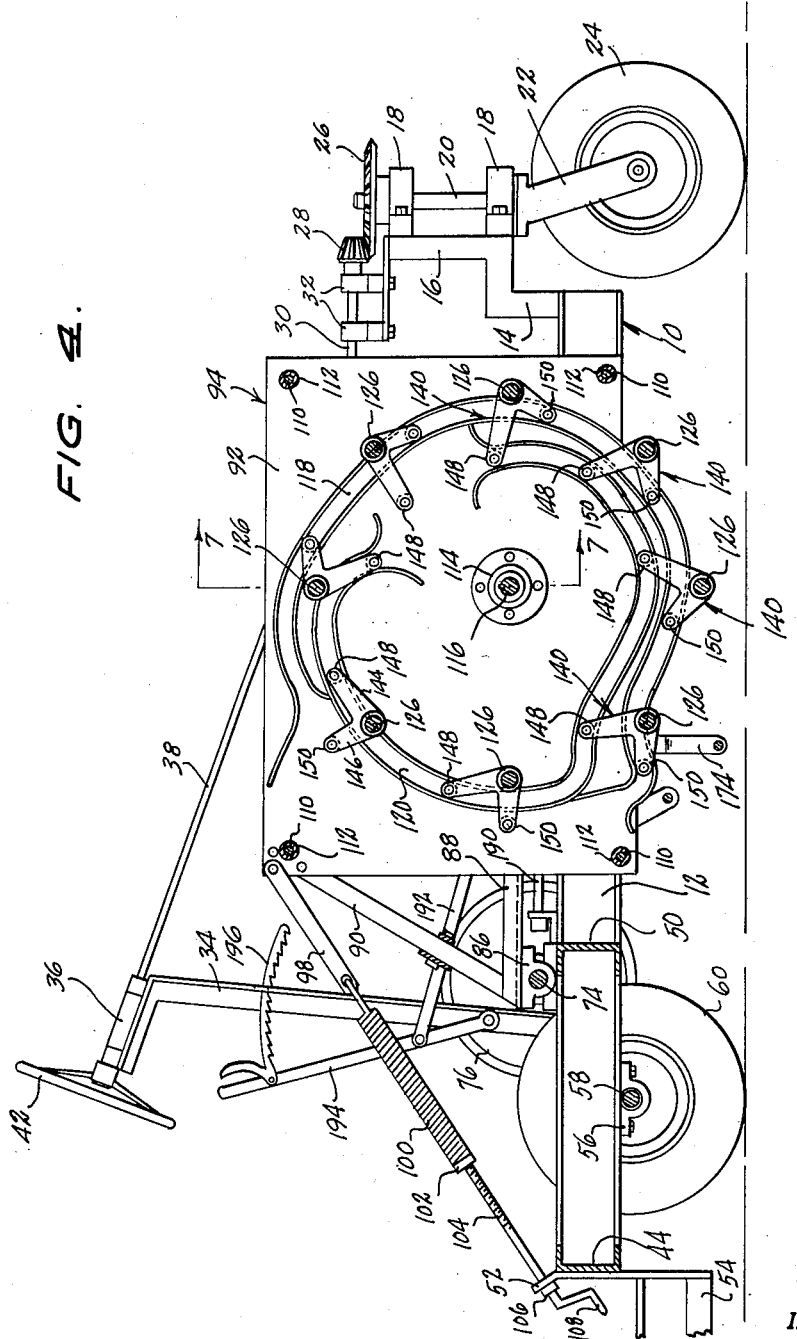
Figure 4 is a longitudinal sectional view taken substantially on the line 4—4 of Figure 1.
Figure 5:
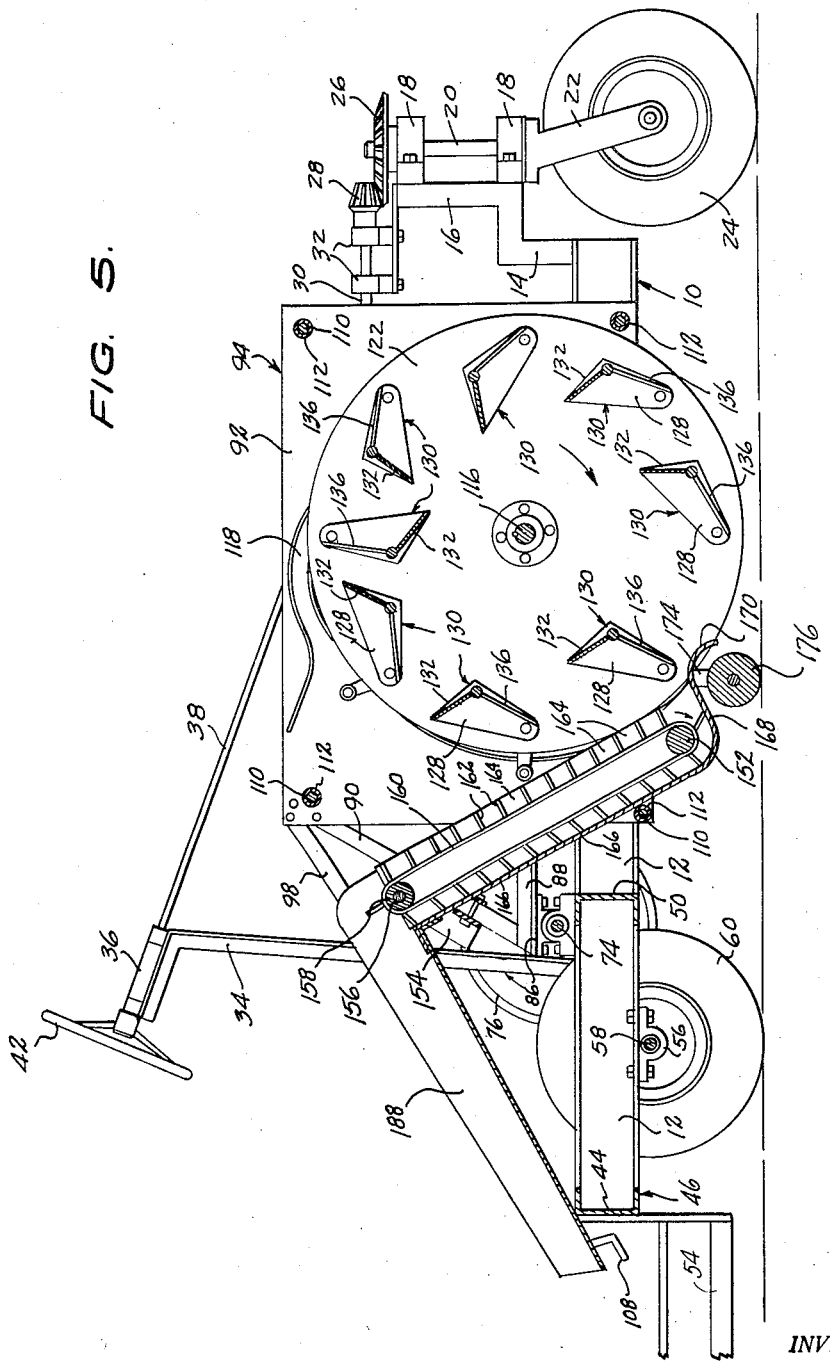
Figure 5 is a longitudinal sectional view taken substantially on the line 5—5 of Figure 1.

Referring to the drawings in detail, a bed frame designated generally 10 comprises spaced parallel side bars 12, the forward ends of which are secured to a transversely extending end bar 14 carrying an upwardly extending forwardly offset column 16 to which are secured vertically spaced bearings 18 in which is mounted for rotation a vertically extending shaft 20 carrying below the lowermost bracket 18 a fork 22 in which a ground wheel 24 is mounted to rotate. A beveled gear 26 is secured to the upper end of the shaft 22 above the upper bearing 18 and has meshing engagement with a beveled pinion 28 which is carried by a horizontally extending shaft 30 carried in suitable bearings 32 which in turn are carried by the column 16 adjacent the upper end thereof. Carried by the frame 10 and extending upwardly therefrom remote from the forward cross bar 14 is an upwardly extending support 34, the upper end of which carries a bearing sleeve 36 in which is mounted for rotation a steering shaft 38 which is coupled to the shaft 30 by means of a conventional universal joint 40, and fixed to the shaft 38 remote from the universal joint 40 is a steering wheel 42 by means of which the path along which the picker is advanced may be selected.

Secured to the side bars 12 and extending transversely thereacross adjacent the ends thereof remote from the cross member 14 is the rearmost bar 44 of a laterally extending arm designated generally 46 carrying adjacent the side of the picker remote from the frame 10 a forwardly extending frame member 48 which is connected at its forward end to a frame member 50 which extends transversely of the machine and is connected to the side bar 12 adjacent that from which extends the bar 44. Carried by the rear cross bar 44 of the bed frame 10 and the arm 46 are upwardly and rearwardly extending ears 52, the purpose of which will hereinafter appear, and supported on the bed frame 10 and the arm 46 and extending rearwardly therefrom is a platform 54 upon which a receptacle for receiving the picked fruit may be removably supported. Carried by opposite side bars 12 of the frame 10 are bearings 56 in which a shaft 58 is mounted and rotatably supported on said shaft 58 is a rear ground or traction wheel 60. The drive shaft 58 is extended laterally of the bed frame and parallel to the arm 46 and is journaled in a suitable bearing carried by the bar 48 of the frame. A second ground wheel 62 is mounted on the shaft or axle 58 for rotation remote from the frame 10 to provide a tricycle upon which the picking mechanism is supported and secured to the axle 58 adjacent the end thereof remote from the frame 10 is a drive sprocket 64 by means of which the drive axle 58 is rotated in a manner to be more fully hereinafter set forth.

Drive mechanism

Mounted on the frame 10 for longitudinal movement thereon substantially midway between opposite ends of opposite side bars 12 is a prime mover designated generally 66 having a drive shaft 68 carrying a drive pulley 70. Mounted in suitable bearings 72 carried by the bed frame 10 and arm 46 and extending transversely across the frame 10 and the front end of the arm 46 is a drive shaft 74 carrying adjacent its end adjacent the bed frame 10 a drive pulley 76 over which is trained a drive belt 78. This belt 78 extends around the drive pulley 70 and upon moving the prime mover 66 forwardly on the frame 10, the belt 78 will be tightened to establish driving connection between the prime mover 66 and the shaft 74. Longitudinally spaced drive sprockets 80 and 82 are carried by the shaft 74 adjacent the end thereof remote from the drive pulley 76 and trained over the drive sprocket 80 and the sprocket 64 is an endless chain 84 which establishes driving connection between the shaft 74 and the axle 58 so that when the prime mover 66 is in operation and the belt 78 is tightened, the axle 58 will be rotated to propel the machine along a path selected by the user manipulating the steering wheel 42.

Harvesting unit

Mounted on the shaft 74 for rocking movement thereabout are longitudinally spaced bearings 86 carrying forwardly extending arms 88 and upwardly and forwardly extending inclined arms 90 to which arms 88 and 90 are fixed the side plates 92 of a harvesting unit designated generally 94. Pivotally coupled to each plate 92 adjacent its upper rear end is a link 98 to one end of which is coupled a retractile coil spring 100, the opposite end of which is coupled to a nut 102 which threadedly engages a threaded bar 104 which is mounted for rotation in an ear 52. Each bar 104 is provided with a stop collar 106 which engages its respective ear 52 and carried by each threaded bar adjacent the stop collar 106 is a hand crank 108. It will thus be seen that the side plates 92 of the harvesting unit 94 will be yieldingly supported by the spring 100 for movement in a vertical arc in front of the arm and adjacent one side of the frame 10.

Extending through the side plates 92 of the harvesting unit 94 adjacent the corners thereof are through bolts 110 which are surrounded by spacing sleeves 112 which cooperate with the bolts in retaining the side plates 92 in spaced parallel relation. Carried by the side plates are bearings 114 in which the main driven shaft 116 of the harvesting unit is mounted to rotate. Carried by opposed faces of the plates 92 are cam tracks 118 and 120, the purpose of which will hereinafter appear. Mounted on the shaft 116 for rotation therewith between the plates 92 are rotor discs 122 carrying adjacent their peripheries circumferentially spaced bushings 124 in which are journaled trunnions 126 carried by opposite end walls 128 of the scoop shaped berry stripping combs designated generally 130. Each comb includes besides the end walls 128 a back wall 132 which is carried by and extends between the end walls 128, and carried by the end walls 128 and extending longitudinally adjacent the back wall 132 is a comb back 134 carrying longitudinally spaced stripper teeth 136 which, when the device is in use, pass between the stalks and through the foliage of the plants being harvested to strip the berries therefrom. In order to rock the stripper combs 130 about the axes of their respective trunnions 126, each trunnion has keyed thereto, as at 138 (Fig. 7) a rock arm designated generally 140. Each rock arm 140 comprises a hub 142 (Fig. 9) which is keyed to its respective trunnion and carries divergent outwardly extending arms 144 and 146. The arms 144 and 146 carry adjacent their ends remote from the hub 142 rollers 148 and 150, respectively, which are engaged in the cam tracks 120 and 118, respectively. It will thus be seen that as the stripping combs 130 move in their circular path concentric about the axis of the shaft 116, the rollers 150 and 148 engaging the cam tracks 118 and 120, respectively, will cause the trunnions 126 to rock about their respective axes so as to rock their respective stripping combs 130 in a manner to efficiently strip the fruit from the stalks and stems and deposit them in a manner to be more fully hereinafter described for conveyance to a suitable container.

Carried by and extending between the plates 92 in spaced relation to the peripheries of the discs 122 of the rotor is an idler roller 152 and mounted for adjustment longitudinally on the struts 90 are brackets 154, and carried by the brackets and extending transversely of the machine between the struts 90 is a drive shaft 156 carrying a drive roller 158. The drive roller 158 and idler roller 152 are of a length substantially equal to the distance between the discs 122 and trained over these rollers is an endless belt 160 carrying outwardly extending flights 162 forming pockets 164 for the reception of the picked product. A back or shield 166 is carried by the side plates 92 of the harvesting unit 94 and extends rearwardly and upwardly from a point near the lower edges of the plates 92 in a plane substantially parallel to a tangent to the peripheries of the discs 122. This shield terminates adjacent its lower end in an upwardly and forwardly inclined flange defining a receiving trough into which the picked fruit is dumped from the combs 130 and carried by the upward forward edge of the flange 168 is a forwardly and downwardly curved lip 170 which serves as a shield to prevent the stripped stalks from possible conflict with the pressure roller, to be more fully hereinafter described, and resulting injury.

Carried by suitable brackets 172 carried by opposite plates 92 of the harvesting unit 94 are vertically adjustable legs 174 and mounted in the legs adjacent the lower ends thereof and extending transversely of the machine below the plates 92 and the flange 168 and lip 170 is a hold down roller 176 which is adapted to engage the plants to hold them downwardly against the ground during the time the fruit is being stripped therefrom by the upwardly moving combs 130. Carried by the shaft 156 adjacent one end thereof is a drive pulley 178 which is adapted to rotate the roller 158 in order to move the belt 160 and the flights 162 upwardly adjacent the advancing movement of the picker.

Mounted on the shaft 116 adjacent one end thereof is a sprocket 180 and driving connection between the drive sprocket 82 and the sprocket 180 is established by an endless chain 182 so that when the shaft 74 is in motion, the rotor of the harvesting unit will be driven.

Mounted on the shaft 116 adjacent the sprocket 180 is a drive pulley 184 which has driving connection with the pulley 178 through the medium of an endless belt 186. Secured to the shield 166 adjacent the upper rear end thereof and extending downwardly and rearwardly therefrom is a chute 188 into which the fruit carried upwardly by the flights 162 of the endless belt 160 is deposited for discharge into a receptacle (not shown) carried on the platform 54 adjacent the rear end of the machine.

In the preferred form of the invention, the prime mover 66 is mounted on longitudinally extending spaced parallel guides 190 to move longitudinally of the frame 10 and coupled to the prime mover is a link 192 which extends rearwardly from the prime mover and is pivotally connected to a hand lever 194 which is pivotally connected to the pedestal 34 and carries adjacent its upper end a quadrant 196 which projects through an opening in the pedestal, one wall of which is engaged by a selected tooth carried by the quadrant 196. It will thus be seen that by rocking the hand lever 194, relative to the pedestal, tension may be applied to the belt 78 to provide a clutch by means of which the movement of the device under the effort of the prime mover may be regulated.

In use with the prime mover 66 in operation, the user, by moving the lever 194 forwardly, will place the belt 78 under tension to impart driving effort to the pulley 76 on the drive shaft 74. Thus, through the medium of the sprocket 82 and chain 84, the axle 58 will be driven to advance the picker along a selected path, the path being selected by manipulation of the steering wheel 42 which imparts a selected position to the front ground wheel 24. With the tension of the springs 100 adjusted by the hand cranks 108, it will be obvious that the position of the harvesting unit 94 may be regulated to carry the harvesting combs 130 to the proper height above the ground as they move through the stems and foliage of the plants being harvested. Obviously, as the combs 130 move in their orbital path between the side plates 92, it will be evident that they will be rocked to selected positions according to the cam tracks 118 and 120 so that as they approach and move upwardly away from the flange 170, the contents of the combs will be dumped into the trough 168 and carried upwardly by the flights 162 to be deposited in the chute 188 adjacent the upper forward end thereof through which they fall by gravity into a receptacle (not shown) supported on the platform 54. Obviously, as the teeth or prongs 136 of the combs 130 move upwardly toward the flange 170, upward pull will be exerted on the stalks and foliage of the plants and tend to tear them from the ground. The roller 176, however, by reason of the fact that it is adjusted to travel along the surface of the ground and carried by the harvesting unit 94 will serve to hold the plants and vines downwardly during the upward stripping movement of the combs. In this way, injury to the plants will be avoided and at the same time the fruit will be readily stripped therefrom with but a minimum of effort on the part of the user who merely rides upon the frame 10 and steers the machine along a selected course.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a harvester for cranberries, a mobile frame, a horizontally disposed drive shaft positioned transversely of and on one side of said frame and carried by said frame, a pair of upstanding side plates arranged in parallel spaced relation positioned longitudinally of said frame and forwardly of said shaft and connected to said shaft for rocking movement about said shaft as an axis, a ground contacting roller positioned transversely of said plates between the ends thereof and supported by said plates, a horizontally disposed driven shaft arranged forwardly of and in parallel spaced relation with respect to said drive shaft and journaled in said side plates, a disc arranged inwardly of and adjacent each side plate and connected to said driven shaft for rotation with the latter, a plurality of berry picking scoop shaped combs positioned between said discs and in spaced relation about said driven shaft and each connected adjacent the front end thereof to said discs for pivotal movement about a horizontal axis, and means connecting said driven shaft to said drive shaft for rotation with the latter.

2. In a harvester for cranberries, a mobile frame, a horizontally disposed drive shaft positioned transversely of and on one side of said frame and carried by said frame, a pair of upstanding side plates arranged in parallel spaced relation positioned longitudinally of said frame and forwardly of said shaft and connected to said shaft for rocking movement about said shaft as an axis, a ground contacting roller positioned transversely of said plates between the ends thereof and supported by said plates, a horizontally disposed driven shaft arranged forwardly of and in parallel spaced relation with respect to said shaft and journaled in said side plates, a disc arranged inwardly of and adjacent each side plate and connected to said driven shaft for rotation with the latter, a plurality of berry picking scoop shaped combs positioned between said discs and in spaced relation about said driven shaft and each connected adjacent the front end thereof to said discs for pivotal movement about a horizontal axis, means connecting said driven shaft to said drive shaft for rotation with the latter, and spring means operatively connected to said side plates adjacent said drive shaft for yieldingly supporting said side plates for movement of said plates about said drive shaft as an axis.

3. The structure according to claim 1 which includes in addition a shield extending in an upwardly sloping direction toward said drive shaft and carried by said side plates, the lower end of said shield having a trough positioned adjacent the periphery of said discs for receiving the berries from said combs, conveying means positioned within said shield for transporting the berries away from said trough, and a chute in communication with the upper end of said shield and conveying means for delivering the berries received from said conveying means to a collection point on said frame.

4. The structure according to claim 1 in which each of said combs comprises a pair of end walls, a back wall carried by the end walls, and a comb back carrying longitudinally spaced stripper teeth projecting forwardly from said back wall and between the end walls.

References Cited in the file of this patent
UNITED STATES PATENTS

| Number | Name | Date |
|---|---|---|
| 378,775 | Disbrow | Feb. 28, 1888 |
| 410,397 | Bee | Sept. 3, 1889 |
| 546,777 | Hasey | Sept. 24, 1895 |
| 889,968 | Rickey | June 9, 1908 |
| 1,036,396 | Williams | Aug. 20, 1912 |
| 1,047,327 | Stewart | Dec. 17, 1912 |
| 1,214,361 | Parker | Jan. 30, 1917 |
| 1,233,089 | Maglathlin | July 10, 1917 |
| 1,435,076 | Mattheis | Nov. 7, 1922 |
| 1,461,642 | Allen | July 10, 1923 |
| 1,632,597 | Hall | June 14, 1927 |
| 1,707,878 | Roosa | Apr. 2, 1929 |
| 1,908,082 | Tinsley | May 9, 1933 |
| 2,218,510 | Albertson et al. | Oct. 22, 1940 |
| 2,256,829 | Hyman | Sept. 23, 1941 |
| 2,497,409 | Jones | Feb. 14, 1950 |
| 2,504,459 | Schneider et al. | Apr. 18, 1950 |
| 2,524,083 | Ronning | Oct. 3, 1950 |
| 2,607,180 | Stankavich et al. | Aug. 19, 1952 |
| 2,641,887 | Korsmo et al. | June 16, 1953 |
| 2,671,301 | Harrison | Mar. 9, 1954 |
| 2,692,468 | Willis | Oct. 26, 1954 |